(12) United States Patent
Spitler et al.

(10) Patent No.: US 10,106,452 B2
(45) Date of Patent: Oct. 23, 2018

(54) SYSTEM AND METHOD OF CONTINUOUS GLASS FILAMENT MANUFACTURE

(71) Applicants: Charles Douglas Spitler, Southlake, TX (US); Rodney Ray Wilkins, Granville, OH (US)

(72) Inventors: Charles Douglas Spitler, Southlake, TX (US); Rodney Ray Wilkins, Granville, OH (US)

(73) Assignee: Superior Fibers, LLC, Reedsville, WV (US)

( * ) Notice: Subject to any disclaimer, the term of this patent is extended or adjusted under 35 U.S.C. 154(b) by 0 days.

(21) Appl. No.: 15/224,175

(22) Filed: Jul. 29, 2016

(65) Prior Publication Data

US 2016/0333511 A1 Nov. 17, 2016

Related U.S. Application Data

(63) Continuation-in-part of application No. 14/181,426, filed on Feb. 14, 2014, now Pat. No. 9,446,978.

(Continued)

(51) Int. Cl.

| | |
|---|---|
| *B29C 53/66* | (2006.01) |
| *C03B 37/083* | (2006.01) |
| *D04H 3/004* | (2012.01) |
| *D04H 3/12* | (2006.01) |
| *C03B 37/02* | (2006.01) |
| *C03B 37/03* | (2006.01) |
| *C03B 5/04* | (2006.01) |
| *C03C 25/143* | (2018.01) |

(Continued)

(52) U.S. Cl.
CPC .............. *C03B 37/083* (2013.01); *C03B 5/04* (2013.01); *C03B 37/02* (2013.01); *C03B 37/0203* (2013.01); *C03B 37/0213* (2013.01); *C03B 37/03* (2013.01); *C03B 37/08* (2013.01); *C03C 25/143* (2013.01); *C03C 25/28* (2013.01); *C03C 25/285* (2013.01); *D04H 3/004* (2013.01); *D04H 3/12* (2013.01); *B29C 53/66* (2013.01); *B29C 53/8041* (2013.01)

(58) Field of Classification Search
CPC ... B29C 53/66; B29C 53/665; B29C 53/8041; C03B 37/0203; C03B 37/0209; C03B 37/0213; C03B 37/03; C03B 37/07; C03B 37/08; C03B 37/083; D04H 3/004; D04H 3/02; D04H 3/07; D04H 3/12
See application file for complete search history.

(56) References Cited

U.S. PATENT DOCUMENTS 2,081,060 A 5/1937 Modigliani
2,357,676 A 9/1944 Mack
(Continued)

FOREIGN PATENT DOCUMENTS

WO 2011106537 A3 1/2012

*Primary Examiner* — Michael A Tolin
(74) *Attorney, Agent, or Firm* — Bakos & Kritzer

(57) ABSTRACT

A system and a method of manufacturing continuous glass filament fiberglass media comprises melting glass within a temperature controlled melter. Molten glass exits through a bushing plate with orifices of varying row configurations and orientations. The resulting fiberglass filaments are received on a rotating drum and sprayed with resin and aqueous solution. The resulting fiberglass mat is placed onto a let-off table then sprayed with aqueous solution before further processing.

19 Claims, 12 Drawing Sheets

Related U.S. Application Data

(60) Provisional application No. 62/282,444, filed on Jul. 31, 2015.

(51) Int. Cl.
  *C03C 25/28* (2018.01)
  *C03C 25/285* (2018.01)
  *C03B 37/08* (2006.01)
  *B29C 53/80* (2006.01)

(56) References Cited

U.S. PATENT DOCUMENTS

| | | | |
|---|---|---|---|
| 2,505,045 A | 7/1948 | Holcomb | |
| 2,460,899 A | 2/1949 | Modigliani et al. | |
| 2,486,217 A | 10/1949 | Slack et al. | |
| 2,546,230 A | 3/1951 | Modigliani | |
| 2,574,221 A | 11/1951 | Modigliani | |
| 2,609,320 A | 9/1952 | Modigliani | |
| 2,779,969 A | 1/1953 | Bose | |
| 2,639,759 A | 5/1953 | Simison | |
| 2,644,780 A * | 7/1953 | Simkins | C03B 37/075 156/174 |
| 2,729,582 A | 1/1956 | Modigliani | |
| 2,751,483 A | 6/1956 | Keen et al. | |
| 2,798,531 A | 7/1957 | Jackson | |
| 2,913,037 A * | 11/1959 | Piero Modigliani | D04H 3/02 156/167 |
| 2,964,439 A | 12/1960 | Modigliani | |
| 2,997,096 A | 8/1961 | Morrison et al. | |
| 3,051,602 A * | 8/1962 | Schairbaum | B65H 54/28 156/167 |
| 3,082,615 A * | 3/1963 | Alvarez de Toledo | C03B 37/0209 222/146.5 |
| 3,096,161 A | 7/1963 | Morrison et al. | |
| 3,097,710 A | 7/1963 | Copenhefer | |
| 3,134,704 A | 5/1964 | Modigliani | |
| 3,278,282 A * | 10/1966 | Jaray Francis | C03B 37/083 425/464 |
| 3,322,585 A | 5/1967 | Weber et al. | |
| 3,459,613 A * | 8/1969 | Copenhefer | D04H 3/02 156/167 |
| 3,476,635 A | 11/1969 | Heh | |
| 3,526,488 A * | 9/1970 | Schweppe | C03B 37/02 65/513 |
| 3,526,557 A | 9/1970 | Taylor, Jr. | |
| 3,573,016 A | 3/1971 | Rees | |
| 3,623,857 A * | 11/1971 | McFadden | C03B 5/1672 420/452 |
| 3,826,903 A | 7/1974 | Varasso | |
| 3,837,138 A | 9/1974 | Terry | |
| 3,937,860 A | 2/1976 | Gusman et al. | |
| 4,121,918 A * | 10/1978 | Shono | C03B 37/083 425/72.2 |
| 4,188,197 A | 2/1980 | Amberkar et al. | |
| 4,227,906 A * | 10/1980 | Rieser | C03B 37/0213 264/210.8 |
| 4,263,007 A | 4/1981 | Battigelli et al. | |
| 4,321,074 A * | 3/1982 | Glaser | C03B 37/0213 65/513 |
| 4,334,468 A | 6/1982 | Guttinger et al. | |
| 4,363,645 A * | 12/1982 | Eisenberg | C03B 37/08 65/478 |
| 4,380,462 A * | 4/1983 | Shono | G08B 29/185 65/496 |
| 4,556,154 A | 12/1985 | Bajtala et al. | |
| 4,601,937 A | 7/1986 | Latussek | |
| 4,773,764 A | 9/1988 | Colombani et al. | |
| 4,940,502 A | 7/1990 | Marcus | |
| 5,139,841 A | 8/1992 | Makoui et al. | |
| 5,149,394 A | 9/1992 | Held | |
| 5,284,546 A | 2/1994 | Tilby | |
| 5,330,595 A | 7/1994 | Held | |
| 5,340,651 A | 8/1994 | Esu | |
| 5,458,051 A | 10/1995 | Alden et al. | |
| 5,532,050 A | 7/1996 | Brooks | |
| 5,578,371 A * | 11/1996 | Taylor | D04H 1/64 427/389.8 |
| 5,612,405 A | 3/1997 | Bainbridge et al. | |
| 5,618,622 A | 4/1997 | Gillberg-LaForce et al. | |
| 5,634,954 A | 6/1997 | Kern | |
| 5,672,399 A | 9/1997 | Kahlbaugh et al. | |
| 5,695,848 A * | 12/1997 | Wilkins | D04H 3/02 428/131 |
| 5,832,696 A | 11/1998 | Nagy et al. | |
| 5,846,603 A | 12/1998 | Miller | |
| 6,054,081 A | 4/2000 | Bielfeldt | |
| 6,136,058 A | 10/2000 | Miller | |
| 6,200,682 B1 | 3/2001 | Dubelsten et al. | |
| 6,605,245 B1 | 8/2003 | Dubelsten et al. | |
| 6,821,614 B1 | 11/2004 | Dubelsten et al. | |
| 6,863,512 B2 | 3/2005 | Dubelsten et al. | |
| 8,057,566 B1 | 11/2011 | Sanders et al. | |
| 8,080,488 B2 * | 12/2011 | Anderson | B01D 39/2024 428/172 |
| 8,393,180 B1 | 3/2013 | Sanders et al. | |
| 9,101,860 B2 | 8/2015 | Green et al. | |
| 2004/0163540 A1 | 8/2004 | Mori et al. | |
| 2005/0006808 A1 | 1/2005 | Thomas | |
| 2005/0067113 A1 | 3/2005 | Colson et al. | |
| 2005/0138832 A1 | 6/2005 | Hada et al. | |
| 2006/0093815 A1* | 5/2006 | Wilkins | B01D 39/2017 428/364 |
| 2007/0049143 A1 | 3/2007 | D'Silva et al. | |
| 2008/0015201 A1 | 1/2008 | Grooms et al. | |
| 2008/0105612 A1 | 5/2008 | Chappas | |
| 2010/0139224 A1 | 6/2010 | Lim et al. | |
| 2011/0086567 A1 | 4/2011 | Hawkins et al. | |
| 2011/0114554 A1 | 5/2011 | Li et al. | |
| 2012/0255662 A1 | 10/2012 | Green | |
| 2012/0271445 A1 | 10/2012 | Li et al. | |
| 2012/0298582 A1 | 11/2012 | Kanani et al. | |
| 2012/0304603 A1 | 12/2012 | Wyss et al. | |
| 2014/0196423 A1 | 7/2014 | Barrows et al. | |
| 2015/0232373 A1 | 8/2015 | Spitler et al. | |

\* cited by examiner

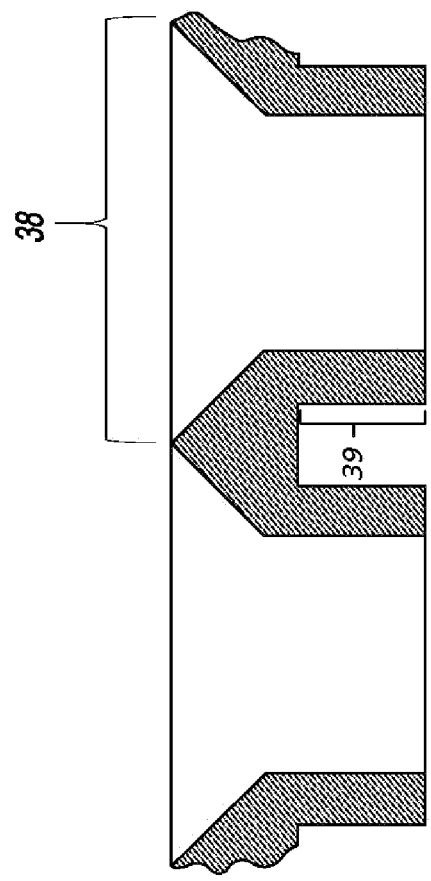
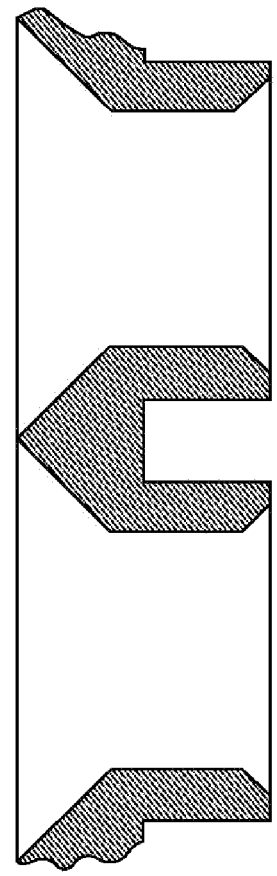
FIG. 5A
FIG. 5B

SYSTEM AND METHOD OF CONTINUOUS GLASS FILAMENT MANUFACTURE

CROSS REFERENCE TO RELATED APPLICATIONS

This application is a continuation-in-part of U.S. patent application Ser. No. 14/181,426, filed Feb. 14, 2014, now U.S. Pat. No. 9,446,978. This application also claims the benefit of U.S. Provisional Application No. 62/282,444, filed Jul. 31, 2015. The foregoing applications are incorporated by reference herein in their entirety.

TECHNICAL FIELD

This disclosure relates to the manufacture of continuous glass filament strands and, more particularly, to an improved apparatus and method for the manufacture of continuous glass filament strand and fiberglass filtration media. It is particularly applicable to the manufacture of lofted continuous glass filament fiberglass media used for filtration or composites manufacturing.

BACKGROUND

The present disclosure relates to improvements to the Modigliani process as generally described in U.S. Pat. Nos. 2,081,060; 2,546,230; and 2,913,037. Subsequent improvements and variations of the Modigliani process have been made and are known in the art. Little has been done to improve upon the efficiency of the manufacturing methods and apparatus either through new control methods or through process changes.

The Modigliani process and its progeny generally involve a melting furnace feeding molten glass which discharges fine glass filaments. The glass fibers are in turn wrapped around a rotating drum. During the deposition of the fibers on the rotating drum, resins are applied to the surface of the glass as it is accumulated on the rotating drum.

Strands of molten glass exit the melting furnace through a multi-orifice metallic plate (bushing plate) attached to the underside of the melting furnace. The diameter of strands is determined by a combination of the diameters of orifices disposed within the bushing plate, surface velocity of the rotating drum positioned below the melting furnace, onto which glass filaments are pulled and accumulated, and chemical composition of the glass.

Drum length is a determinant of the length of the cured fiberglass media that emerges from the fiberglass curing apparatus. Customers of cured fiberglass generally desire lightweight fiberglass in roll lengths that are up to 1200 feet. These customers also desire heavier weight rolls in lengths as short as 200 feet.

Loft height of the cured fiberglass is an important characteristic. Customers generally desire lofts from ¼ inch to 6 inches. Thinner lofts compress more easily when rolled while thicker lofts are more difficult to compress. The reason for this is that the cross linked resin bonds in cured fiberglass resist bending. The bending resistance increases with the distance the cross linked bond must travel when the loft is compressed in the process. If the bond is subjected to too much deformation, it ultimately breaks, which lessens the ability of the cured fiberglass to return to its specified loft when the roll is unwound.

There is an interaction between drum circumference and curing apparatus width which affects the geometry of filament cross linking in the finished product. The design of the curing apparatus is constrained by many factors, one of which is the width of the upper loft-setting conveyor belt (or chain) which is used to set the loft of the product. Because customer product specifications for loft have narrow tolerances, typically + or −one eighth of an inch or one quarter of an inch, there can be very little deflection of the upper loft-setting conveyor across its width. At design widths exceeding 132 inches, it becomes mechanically complex and prohibitively expensive to limit deflection sufficiently. If the width of the unexpanded fiberglass mat—which is generally equal to the circumference of the drum—is greater than 22 feet, it becomes very difficult to cure the filaments such that the cross linked filaments are cured at angles of approximately 90 degrees. Such curing produces longitudinal and transverse stiffness of the finished media that are approximately equal (which is a common customer requirement.)

Longitudinal filament adherence introduces defects in stiffness and rigidity in either the X or Y (horizontal) axes. It also diminishes compressive strength and reduces the ability of media, especially in air filtration applications, to capture and hold solid and liquid particulates.

If the circumference of the rotating drum (and thus the approximate unexpanded mat width) is less than 12 feet or greater than 22 feet, the filaments will adhere to each other longitudinally for excessive distances in either the X or Y axes as they are cured, which will create insufficient finished product stiffness in one of those two axes. Such conditions also produce insufficient compressive strength (another typical customer requirement) in the loft of the finished product. In air filtration applications, those conditions can diminish the ability of the media to capture and hold particulates. Insufficient compressive strength furthermore leads to cosmetic defects such as bunching of filaments, thereby lessening the product's appeal to customers, both in air filtration and light filtration applications.

Spinning drums ranging from 12 feet to 24 feet in length with circumferences ranging from 12 to 22 feet have varying drum weights along with a variety of typical rotational speeds. The combination of drum length and drum circumferences with varying rotational speed creates vibrations, which tend to result in premature failure of a drum shaft. Failure to properly calculate the appropriate shaft diameters required for safe operation of rotatable drums of various dimensions at various surface velocities has led to shaft failures which creates unsafe conditions.

Several resin binder formulations are known in the art and may be sprayed onto the glass fiber. Generally, the process is designed such that the swath of filaments is sprayed with binder almost immediately after deposition on the drum. The resin thoroughly coats the most recently applied glass filaments and causes the glass filaments to adhere to rest of the filament mat. Proper binder coverage of the filaments may not be achieved if the centrifugal force of the rotating drum overcomes the viscosity of the binder and forces binder closer to the drum to migrate toward the filaments further from the drum.

There remains a considerable need for systems, apparatuses and methods that can improve the efficiency and quality of the manufacture of continuous glass filament media.

SUMMARY

In this disclosure, the terms filament, fiber and strand are used interchangeably and in all cases refer to glass filament that is continuous as opposed to glass staple fiber such as that used in manufacturing fiberglass insulation.

In the present disclosure, a glass melting furnace is situated to traverse above a rotatable hollow drum of a specific range of dimensions. The furnace comprises a temperature-controlled melting reservoir adjacently coupled to a bushing plate perforated with a specific numerical range of countersunk orifices of a specific range of dimensions. The bushing plate is adjacently coupled to a cooling loop and further coupled to side shields. The cooling loop is connected to a water and air supply system which maintains a specific range of temperatures and pressures. A control system with sensors may be used to prevent clogging. The furnace assembly is mounted on tracks and traverses above the rotatable drum such that a swath of continuous glass filaments of a specific range of diameters is deposited onto the rotatable drum. The furnace assembly is communicatively coupled to a control system and sensors for controlling the speed of the traverse and the speed of rotation of the rotatable drum. The furnace assembly is further coupled to spray arms with nozzles which spray a resin binder and optionally other aqueous solutions onto the continuous glass filaments that have been deposited onto the drum. The drum rotates on a shaft of a specific range of dimensions. The shaft is coupled to load cells which are communicatively coupled to a control system. When the load cells indicate to the control system that the total weight of the mat of continuous filament glass saturated with binder, and optionally other aqueous solutions, is at the target weight, operators stop the drum, make a longitudinal cut in the mat, and remove the mat from the drum. The mat is then rolled onto a pole and subsequently unrolled onto a let-off table which comprises a chain conveyor with heat applied from above and below and a nip roller for controlling tension on the mat as it is expanded. When the mat exits the let-off table, it proceeds to a roller and water spray assembly and then to a curing apparatus. The curing apparatus comprises a plurality of heated zones, a lower conveyor belt (or chain) and an upper loft-setting belt (or chain). Once the mat exits the curing apparatus, it proceeds to a slitter-accumulator assembly and then to a windup machine. Operators remove the slit and rolled fiberglass media from the windup machine and package the rolls for shipment.

BRIEF DESCRIPTION OF THE DRAWINGS

The detailed description makes reference to the accompanying figures wherein:

FIG. 5A shows a cross section view of an orifice tip.

FIG. 5B shows an alternative cross section view of an orifice tip.

The figures are only intended to facilitate the description of the principles disclosed herein. The figures do not illustrate every aspect of the principles disclosed herein and do not limit the scope of the principles disclosed herein. Other objects, features, and characteristics will become more apparent upon consideration of the following detailed description.

DETAILED DESCRIPTION

Figure 1:
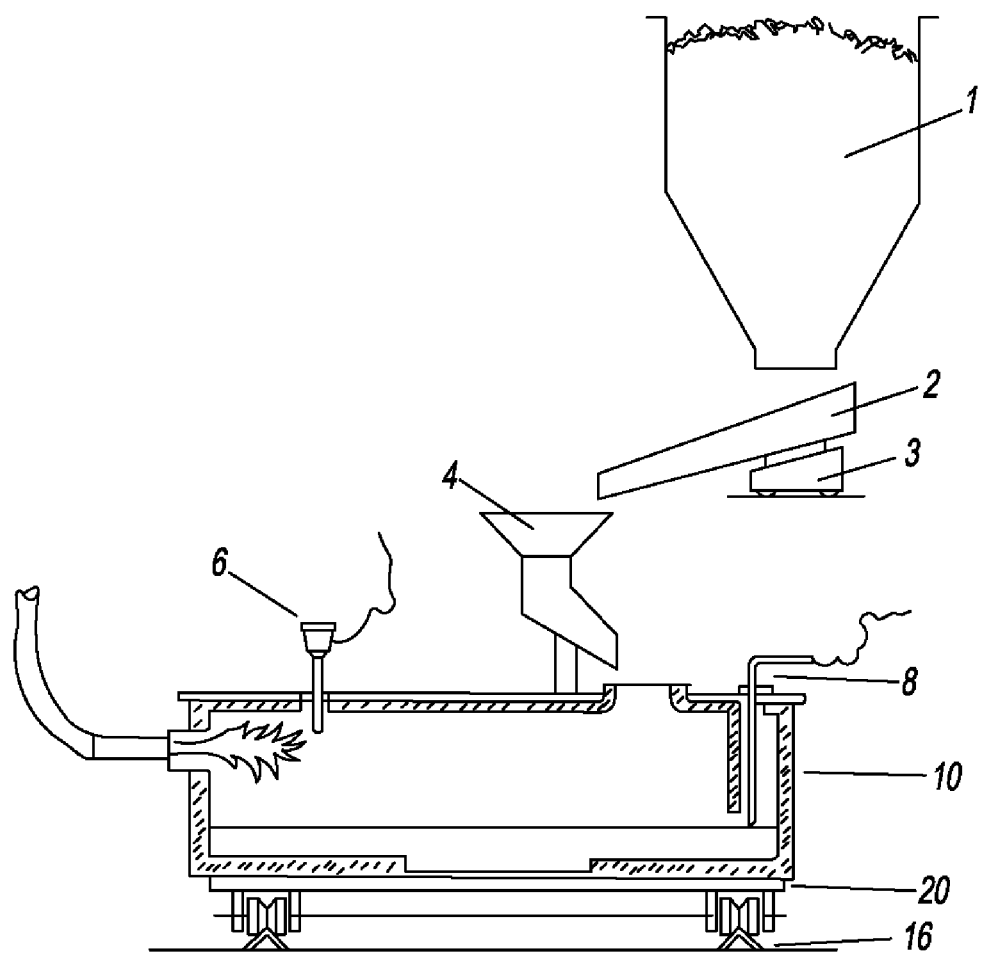
FIG. 1 shows a traversing glass melting furnace with related components.

Raw material inputs are comprised of recycled glass cullet or in some cases non-recycled glass of various configurations, urea formaldehyde or styrene resin and optionally acrylic co-polymers, acrylate polymers, water or other additives or diluents. The mixed resin is referred to as binder. The recycled glass cullet is sorted for purity and clarity or turbidity which is screened to achieve maximum dimensions of ½ inch to 1¼ inches in size. Referring to FIG. 1, the glass cullet is dropped from a glass hopper 1 onto a stationary glass feeder 2 that is then vibrated using a vibrator 3 to remove any fines or excess glass dust. The vibrated glass cullet is then dropped from the glass feeder 2 to a secondary chute 4 attached to a top of melting furnace 10. The glass melting process involves the use of natural gas and combustion air mixtures controlled by a feedback loop from a flame temperature sensor 6. The air/fuel mixture can be controlled manually if needed during operation and for system start-up and shut-off. The molten glass level is controlled to maintain a minimum level in the furnace based on a set point controller 8. Once the set point controller's minimum is reached, more glass is automatically fed to the furnace by the glass hopper 1, which is coupled to a vibrator 3 mounted under the stationary glass feeder 2, all of which is controlled by a feedback loop from the set point controller 8.

Figure 2:
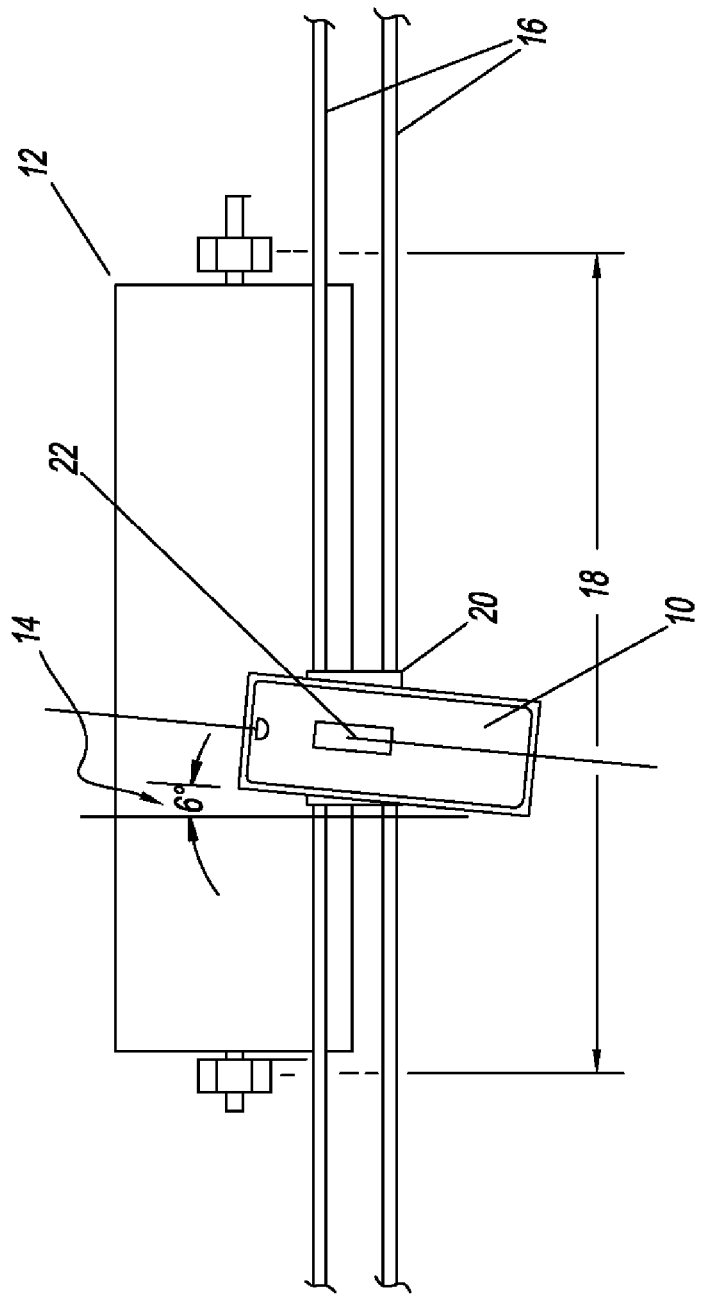
FIG. 2 shows a top view of a glass melting furnace.

Referring to FIG. 2, the melting furnace 10 is mounted on a traverse cart 20 which moves on track 16. Track 16 runs the longitudinal length 18 of the drum 12, which is positioned below the traverse path of the melting furnace 10. The bushing plate 22 is set at a 6 degree angle, plus or minus 1 degree, relative to a line perpendicular to the longitudinal axis of the drum 12, as indicated by arrow 14.

Figure 3:
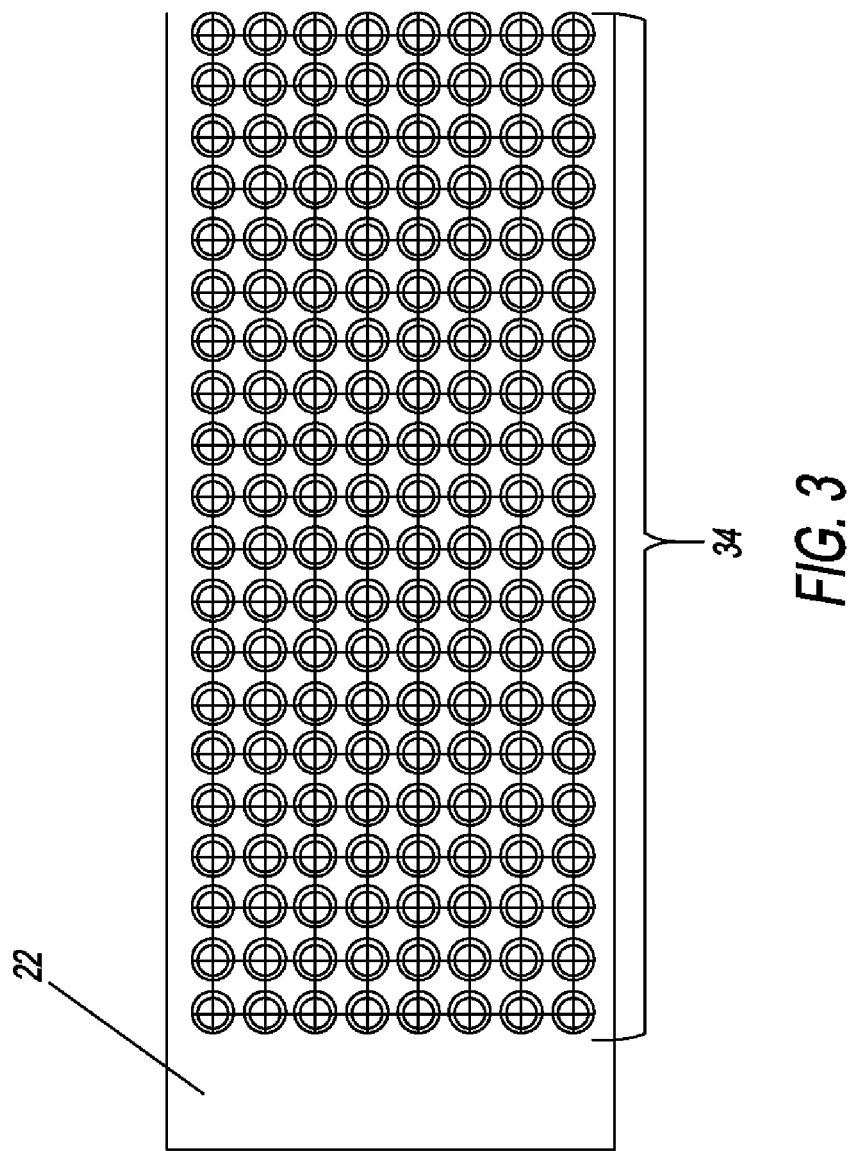
FIG. 3 shows a bottom view of hole placement on a furnace bushing plate.

Molten glass exits the melting furnace 10 through an Inconel bushing plate. FIG. 3 depicts an exemplary configuration 34 of orifices in a bushing plate 22. Orifice patterns are preferably configured with at least 7 rows and no more than 10 rows. The number of orifices may be varied as well, with a 7-row plate preferably having 298 orifices and the 10-row plate preferably having 425 orifices. The bushing plate 22 provides continuous strand filaments of approximately 20 to 35 microns in diameter depending on the desired finished product. The final product specifications determine the configuration of bushing plate 22. Design changes are accomplished through varying bushing plate designs and adjusting the orientation of the bushing plate relative to the longitudinal axis of the rotating drum below it. For example, the relative pattern of the glass fibers fed onto the rotating drum may be adjusted by adjusting by the orientation of the bushing plate. Varying the orifice diameter varies the filament diameters, resulting in layering of fiberglass mat for increased strength and/or improved particulate capture.

Figure 4:
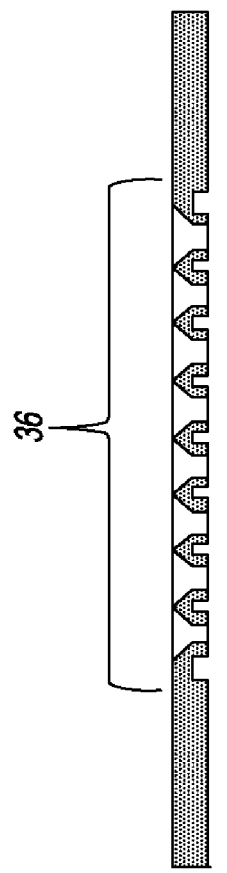
FIG. 4 shows a cross section view of the bottom hole pattern of the bushing plate.

With reference to FIG. 4, bushing plate orifices 36 each have an orifice size ranging from 0.14 inch to 0.19 inch, depending on the product. In some embodiments, the orifices may have alternating hole sizes. Various patterns in different embodiments may space the orifices from 0.313 inches to 0.500 inches, center to center. The bushing plate preferably has a depth of approximately ⅜-inch.

As shown in FIG. 5A, each orifice has an entry side opening 38 and is countersunk on the entry side to remove excess mass and thereby reduce heat transfer to the orifice tip 39, which facilitates more rapid cooling of the glass filaments exiting the orifice tips. Additionally, the length of the orifice tips and positioning of the orifice tips relative to each other allow for more rapid cooling of the molten glass. In some embodiments, an entry throat of the orifice is countersunk at an angle ranging from 70 degrees to 100 degrees, depending on the product being manufactured, which removes mass and therefore reduces heat transference from that area of the bushing plate. In some embodiments, the orifice tip length ranges from 0.095 inch up to 0.25 inch, allowing faster cooling of molten glass exiting the melting glass furnace.

FIG. 5B shows an alternative embodiment in which the orifices are countersunk on both the entry and exit sides of the bushing plate. Providing a countersunk exit throat reduces the surface area exposed to the fiberglass. As a result, the fiberglass filaments exiting the heated bushing plate are cooler. Such a configuration of orifices may be used in applications in which glass filaments exiting the bushing plate would otherwise be too hot. In yet another embodiment, the orifices of the bushing plate may be countersunk on only the exit side of the bushing plate.

To accommodate the various applications of continuous glass filament, it is necessary to control the finished diameter of fiberglass strands. Finer diameter fiberglass strands improve the efficiency of lofted fiberglass air filtration media to capture and hold smaller diameter solid and liquid particulates. Larger diameter fiberglass strands are superior at capturing and holding larger solid and liquid particulates and also improve the rigidity and compressive strength of the finished fiberglass media. For composite applications, finer diameters are required for wrapping around acute angles, with larger fiberglass strand diameter increasing tensile strength. In other applications, such as light filtration, fiberglass strand diameter affects the aesthetics of light diffusion. A bushing plate with orifice diameter of a minimum 0.14 inch is used to produce fiberglass strand diameters used to achieve an ASHRAE MERV 8 specification. A bushing plate with orifice diameter of a maximum 0.19-inch is used to produce continuous glass filaments which hold the largest and heaviest particulates, such as paint droplets, and maintain sufficient rigidity and compressive strength.

Figure 6:
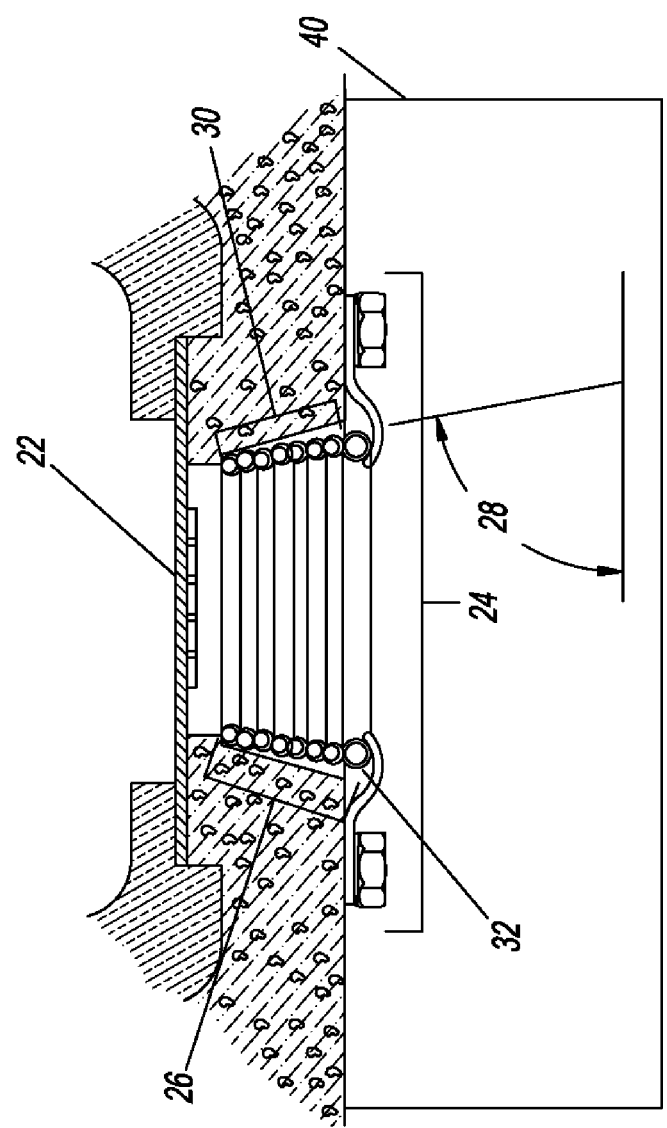
FIG. 6 shows a front cutaway view of a bushing plate.
Figure 7:
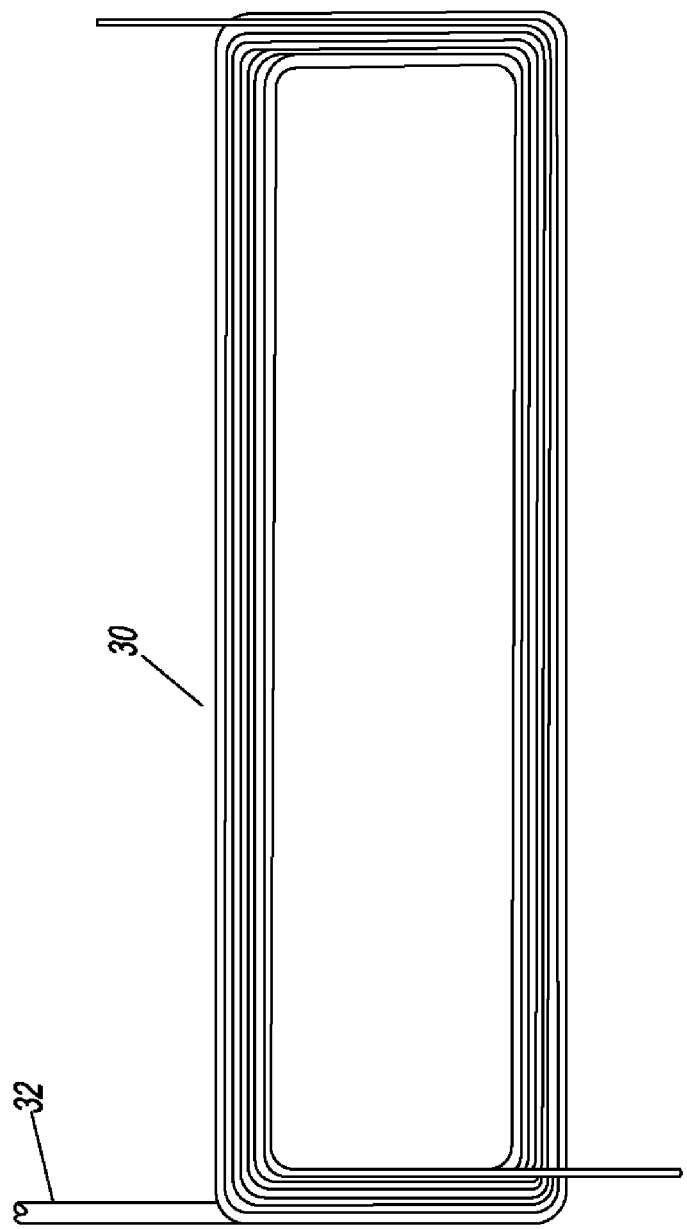
FIG. 7 shows a racetrack pattern for a cooling loop assembly.

FIG. 6 shows a front cutaway view of a bushing plate 22 and a cooling loop assembly 24. The front cutaway view shows loops (or coils) 26 of cooling loop assembly 24. The cooling loop assembly 24 cools the continuous filament strands after they exit the bushing plate to a temperature that is cool to the touch, slightly above ambient temperature. The cooling loop assembly 24 comprises seven to fifteen rows of one quarter inch copper tubes wrapped at the bottom of the melting furnace 10, against the bushing plate 22. These cooling coils are looped in a racetrack or rectangular pattern (shown in FIG. 7) within 1 inch of the bushing plate. The bushing cooling loop assembly 24 executes a loop that is at least 15 inches long and 3 or more inches wide at its inside diameter. The angle (shown as angle 28) of loops 26 is 60-90 degrees relative to the horizontal. An angle at or near 60-90 degrees positions the bottom of a coil farther away from falling glass filaments, which prevents the filaments from contacting the coil and provides improved heat dissipation around the bottom of the bushing plate 22.

The top seven to fifteen layers of coil 26 are composed of ¼-inch copper refrigeration tubing 30 which carries chilled water. The cooling water is supplied either by a chiller or from near-constant temperature water well. Pressure sensors, which are monitored and controlled by the controller 46, detect if the cooling water loop is becoming clogged. Temperature sensors provide feedback to the chiller through the thermal software and sensor control of the controller 46 to control temperatures of the cooling loop assembly 24.

The bottom coil is ⅜-inch copper tubing 32 perforated with side air holes ¹⁄₃₂-inch in diameter directed upward toward bushing plate 22. A cooling loop 32 comprises a single copper air coil that is ⅜-inch diameter and allows exiting air to rapidly cool glass filaments exiting the bushing plate and to retard the flow of glass through the bushing plate as needed.

Shields 40 preferably consist of metal plates and are placed around the area below the bushing plate to prevent ambient air flow from causing filaments to collide as they exit the bushing plate orifices. Preferably, shields are placed on three sides below the bushing plate, leaving one side open to allow access by an attendant. The shields are preferably 6 to 24 inches long. In some embodiments, shorter or longer shields may be used, and shields may be positioned to encircle the entire area below the bushing plate or positioned in other configurations suitable to prevent air flow from disrupting the filaments after they exit the bushing plate.

Figure 8:
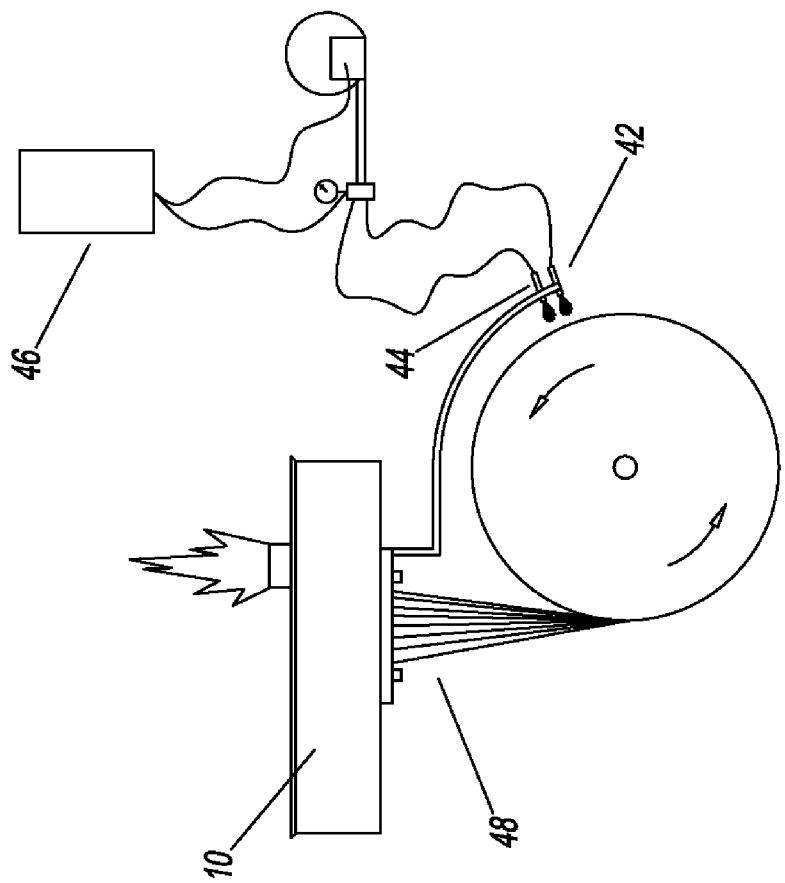
FIG. 8 shows an end cutaway view of a drum in relation to a melting furnace.

FIG. 8 depicts an end view of rotatable drum 12 and a controller 46 which operationally controls spray arms 42 and 44. Controller 46 also controls the production of filaments 48, which exit the glass melting furnace 10 and are positioned onto the rotating drum 12. Controller 46 comprises computer hardware and software to, for example, monitor, measure, and control the production of the fiberglass filaments. As shown in FIG. 8, spray arms 42 and 44 are coupled to melting furnace 10. In some embodiments, spray arms may be separate from the furnace and actuated so that they traverse the drum independently of the furnace.

Figure 9:
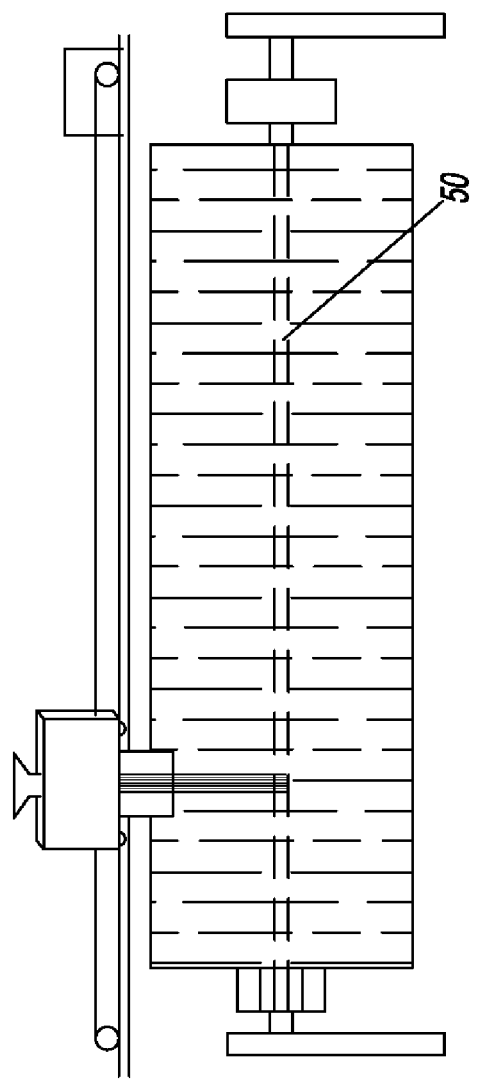
FIG. 9 shows a front view of a drum with the position of the drum shaft indicated.

The rotating drum 12 is wrapped in plastic sheeting to enable the fiberglass mat's removal from the drum. Once the plastic sheeting wraps the drum, a thin application of mold release oil is applied to the surface of the sheeting. As the filament strands fall from the bushing plate, an operator assists the process in attaching the falling filament strands of molten glass to the plastic sheeting wrapped drum. Additionally, the operator may reattach filaments that have detached from the rotating drum. The rotating drum 12 has a circumferentially enlarged surface and longitudinally extended length with an extended shaft 50 (shown in FIG. 9). This allows controller 46 substantial and sustainable control of the rotation of the drum 12, which enables controller 46 to control the speed of layering of fiberglass upon the rotating drum.

It is desirable to spin the fiberglass media on drums of specific lengths in order to manufacture desired roll lengths. Using a specific drum length avoids breaking cross-linked resin bonds. Drums that are at least 12 feet in length are used to produce continuous glass filament media for heavier weight and higher loft fiberglass products in shorter roll length. Drums as long as 24 feet are used to produce lighter weight, lower loft fiberglass media in longer roll length.

Drum circumferences of less than 12 feet create fiberglass mat that, when expanded, exhibit cross linking of resin bonded filaments approaching parallel. Such an acute angle minimizes transverse stiffness of the media, thereby promoting higher failure modes. Angles of cross linked filaments approaching 90 degrees provide stiffness in both the X and Y axes, provide higher compressive strength, improve filtration efficiency, and improve aesthetic appeal in both air and light filtration applications. Optimally, none of the acute angles formed by an intersection of cured filaments should be less than 60 degrees, and most should approach 90 degrees.

Drum circumferences greater than 22 feet do not allow for sufficient expansion of the fiberglass media or mat. This leads to filaments adhering to each other longitudinally for excessive distances. Filament adherence longitudinally introduces defects in transverse stiffness and rigidity, diminishes compressive strength, and reduces the ability of media, especially in air filtration applications, to capture and hold solid and liquid particulates. It furthermore leads to cosmetic defects, such as bunching of filaments, thereby lessening the product's appeal to customers, both in air filtration and light filtration applications.

Spinning drums ranging from 12 feet to 24 feet in length with circumferences ranging from 12 to 22 feet have varying drum weights and are operated at a variety of rotational speeds. Certain combinations of drum length, drum circumference and rotational speed create vibrations, which tend to result in premature failure of a drum shaft. To avoid shaft vibrations, shaft diameters are calculated with respect to drum weight and rotational surface velocities with resultant optimal steel shaft diameters at a minimum of 2.5 inches and no more than 4.5 inches.

The melting furnace repeatedly traverses the drum's length 18 (shown in FIG. 2) following a specified longitudinal continuous path along the traverse track 16. This covers the drum 12 with a layer of fiberglass. In some embodiments, as the glass is applied to the drum 12, a resin mixture is sprayed from a resin arm 42, attached to the traverse cart. Water is sprayed from a water sprayer arm 44 attached to the traverse cart. The resin and water are sprayed onto the fiberglass on the drum 12 by nozzles on the resin sprayer arm 42 and water sprayer arm 44, which are situated and aimed at the front of the drum 12, slightly below the topmost section of the drum 12. The spray nozzles are linked to the movement of the furnace traverse and traverse the front of the drum 12 in synchronicity with the traverse of the furnace above the drum 12. Physical elements of the process are controlled by a computer and software program through a controller 46, which controls the number and speed of furnace movement or furnace traverses, rotation speed of the drum 12, and application of resin spray mixture and water spray mixture. The computer's control of these parameters through a software program and control of these variables and operating parameters through controller 46 permits the mat to have progressive densities when expanded. As the filaments are spun onto the rotating drum 12 the traversing melting furnace 10 traverses along the traverse track 16. The filaments are sprayed with an aqueous solution from water sprayer arm 44, which moves alongside drum 12 as the furnace traverses along the longitudinal length of drum 12. The filaments are also sprayed with binder (or binder species composed essentially of resin, chemical additives, and diluents) from resin sprayer arm 42, which moves alongside drum 12 as the furnace traverses along the longitudinal length of drum 12. Temperature control of the binder in the reservoir is accomplished to within + or −7 degrees of 72 degrees Fahrenheit by the controller 46. The temperature controlled binder or combination binder species may be sprayed onto the rotating drum 12, in tandem with water or an aqueous solution from resin sprayer arm 42 and water sprayer arm 44.

Urea formaldehyde resin as used in filter applications is mixed with specific additives and diluents, optimally under shear mixer conditions. The diluent percent is controlled in the range of 5% to 10% of the binder weight. The binder is maintained at room temperatures by cooling and heating coils in the dispensing tanks, and is agitated in the dispensing tanks. The pH is monitored and controlled to be within the range of 7.0 to 7.8. Binder percent solids is sampled, tested, and controlled to a range of 60% to 68% solids. Additionally, the binder temperature is controlled with a reservoir as a depository for temperature-controlled binder to be sprayed via resin spray arm 42 (shown in FIG. 8).

In some instances, styrene resin for composite applications is mixed with other diluents, optimally by a shear mixer for better mixing, and temperature controlled with heating and cooling coils in the storage and/or dispensing tanks. The diluent percent is controlled in the range of 1% to 5% of the binder weight. The pH is monitored and controlled to be within the range of 7.0 to 7.8, and the tank is continually agitated to ensure complete mixing of the styrene binder with uniform temperature in the storage and/or dispensing tanks. Binder percent solids is sampled, tested, and controlled to a range of 60% to 68% solids.

Water is conditioned soft and in some cases the water is mixed with the resin creating an aqueous solution. The water may be sprayed onto resin as it is applied to the filaments via water spray arm 44, shown in FIG. 8. This controls the moisture level of the resulting fiberglass mat formed. Nozzles may apply water and binder to the fiberglass mat as the filaments are accumulated on the drum to control the moisture to a targeted moisture level plus or minus 5.0%. Additionally, with reference to FIG. 11, water or aqueous solution may be applied as a spray, as a fog or fine mist, or by being rolled onto either or both surfaces of the expanded fiberglass mat before it enters a next phase of the process. Applying water by water fog nozzles onto a flat mat surface applies the water more consistently, resulting in higher quality skins.

Referring to FIG. 8, resin binder coverage uniformity is achieved by atomizing the binder formulation with compressed air at the resin spray arm 42 and nozzle of the resin spray assembly. Because the binder formulation may include water, it is subject to evaporation as it is atomized. To control the viscosity of the binder being applied to the continuous glass filaments on the rotating drum, it is preferred to use computer hardware and software to control the pressure of the compressed air which atomizes the binder as ambient relative humidity changes. Controller 46, which controls the sensors employed to monitor and perform tests, provides information from the sensors to the computer hardware and software.

Due to centrifugal force of the rotating drum, insufficient binder viscosity allows the binder to migrate from the filaments closer to the drum surface to filaments farther from the drum surface. When the fiberglass mat is cured, this migration causes insufficient cross linking of the fibers on the side of the mat closest to the drum, and excessive amounts of binder on the side farthest from the drum. This results in one side of the finished fiberglass media lacking skin, rigidity, and stiffness while the other side can be excessively skinned with excessive rigidity and stiffness. Additionally, the side with excessive amounts of binder will tend to shed particles of cured resin. Any of these conditions can make the finished fiberglass media less desirable or even unusable by customers.

Further, excessive binder viscosity causes the binder spray to be uneven and causes atomized binder particles to adhere to each other and not flow over the glass filaments with uniform coverage. This results in binder cross linking of filaments that is neither uniform nor sufficiently rigid with significant surface skin or compressive strength. At a minimum, at the extremes of ambient relative humidity, controlling binder viscosity at a very low relative humidity requires air pressure at the resin spray nozzle as low as 6 pounds per square inch. Additionally, for high relative humidity, air pressure is required at the resin spray nozzle as high as 32 pounds per square inch.

To achieve a proper coverage of the binder, the binder spray pattern width is monitored and controlled by an operator. In some embodiments, the binder spray pattern width is monitored and controlled by the controller 46 through the use of sensors. Because the glass melting furnace 10 continually traverses back and forth above the rotating drum 12, and because a traversing speed may vary from product to product, the width of the cone-shaped spray pattern must be controlled by an operator or controller 46 to assure proper coating and adhesion of a swath of fibers. Preferred spray widths range from 2 inches to 6 inches.

The fiberglass mat article is complete when a total weight measurement of glass fiber, resin mixture, and water has reached the weight prescribed in the formulation for each specific product. Attainment of the product specific weight can be controlled in some cases by load cells or by calculating the time necessary for that product specific weight to be attained. The formula of the load cell weight control is achieved by taking the weight of the mat on the drum and subtracting the weight of the drum. When the mat reaches its product specific weight, the spinning of the drum is complete and the operator actuates the braking mechanism on the drum drive. The drum has a V-shaped slot that runs longitudinally parallel to the axis of rotation of the drum from one end to other across the width of the drum and thereby across the width of the continuous strand filament mat lying thereupon. The operator uses this slot to cut the mat from the drum. At this point, the mat is promptly removed from the drum, laid on a flat surface, and covered with plastic sheeting. From there the mat is rolled onto a steel bar in a direction parallel to the longitudinal axis of the drum. The weight of the mat is confirmed and recorded by weighing the rolled mat and calculating the net rolled mat weight.

Figure 10:
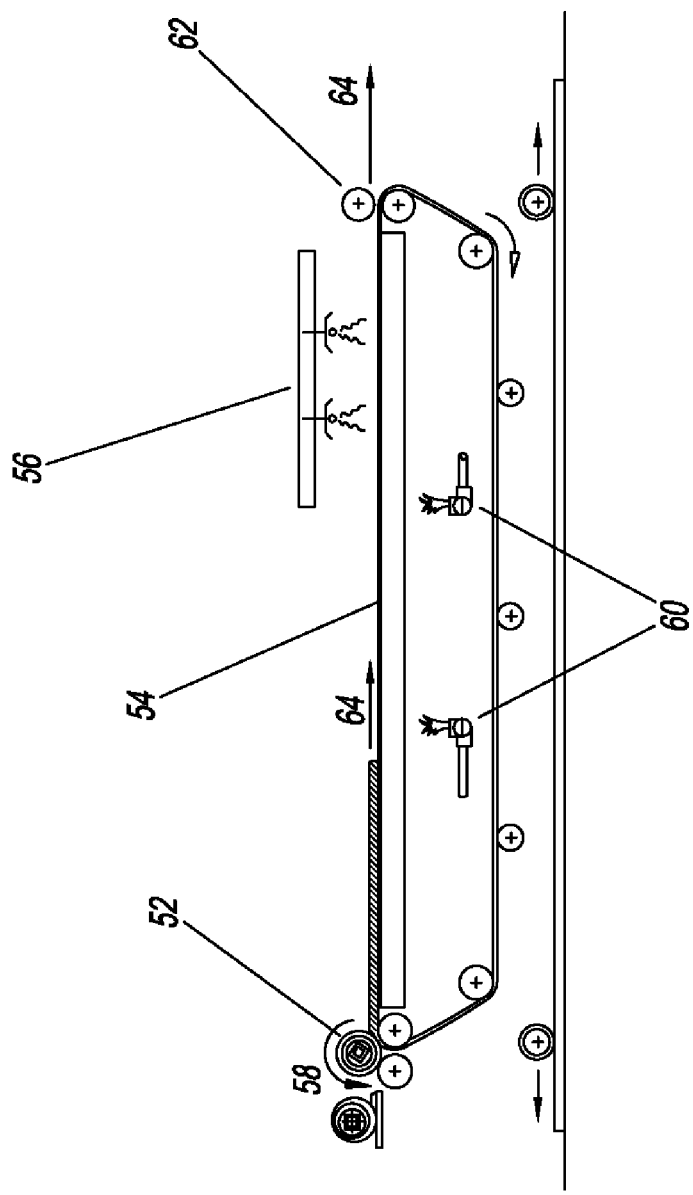
FIG. 10 shows a let-off table with upper and lower heating sources.

With reference to FIG. 10, the rolled mat is transported to a let-off table which comprises a slow moving conveyor 52 supported by a flat surface 54, which is slightly larger than the unrolled mat. The mat is unrolled (in the direction of arrow 58) onto the moving conveyor, and the top layer of plastic is removed. The unrolling process requires that the mat be unrolled with no creases or folds, straight with its edges equidistant from the sides of the conveyor. Otherwise, the unrolled mat will not expand properly. The resin coating the glass strands is heated from above and below. The heat, if required by ambient temperatures, is used to soften the resin. This side cutaway view of a let-off table shows gas burners 60 below the fiberglass mat and radiant heaters 56 above the fiberglass mat, with an arrow 74 indicating direction of travel of the fiberglass mat. As the leading edge of the unrolled mat emerges beyond the exit edge 62 of the conveyor, the bottom layer of plastic falls away from the mat and the leading edge of the mat is guided in the direction indicated by arrow 64.

Figure 11:
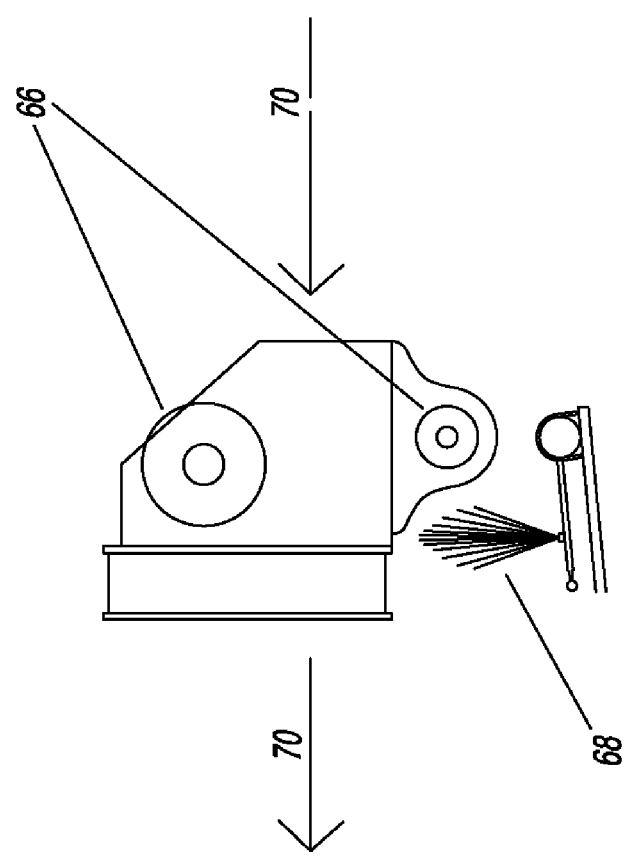
FIG. 11 shows a water and resin spray system.

Referring to FIG. 11, the fiberglass mat is directed through rollers 66 in the direction of arrow 70. The fiberglass mat travels through water spray 68, which applies water or other aqueous solutions onto the fiberglass mat. The water spray is applied to make the arrangement of filaments more uniform and to create a stiffer skin on either the top or bottom surface or both surfaces. The mat then travels onto a bottom conveyor chain using a guide rope attached to the leading edge of the mat. As each mat exits the let-off table, it is attached with ropes to the end of the mat ahead of it so successive mats are continuously drawn in the direction of travel. The ropes are used to connect mats because ropes do not damage the slitter knives used later in the process. The fiberglass mat is then fed into a curing oven with a forced air heating system in a multi-zoned temperature arrangement.

Figure 12:
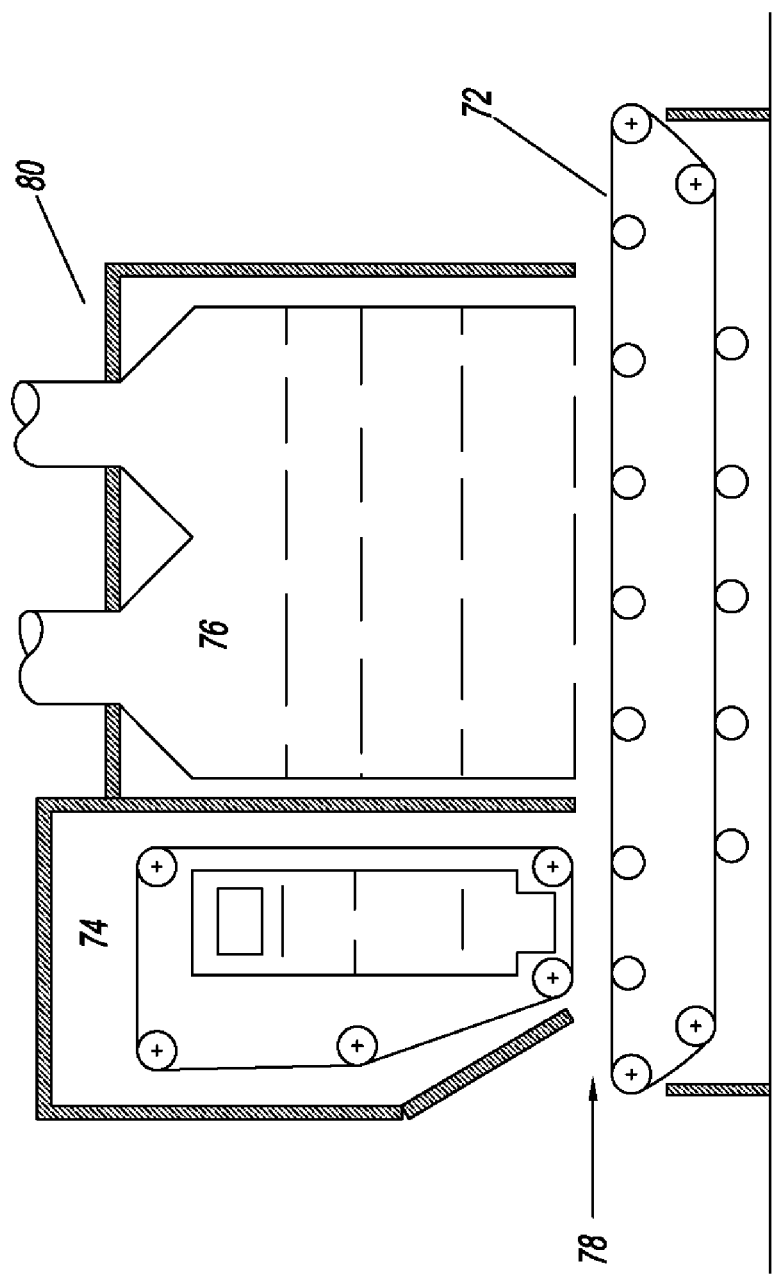
FIG. 12 shows a curing oven assembly.

FIG. 12 is a side view cutaway of the curing oven 80 and the conveyor assembly with controller and temperature zones 76 of the oven. The mat is fed into the curing oven along direction 78 through a conveyor system with an upper chain conveyor 74 and lower chain conveyor 72. The upper conveyor 74 moves at a different speed relative to the lower chain conveyor 72 to keep the mat from bunching and to prevent stretching of the mat. The process parameters are controlled by a controller with a computer, software, temperature sensors and individually heated zones both above and below the conveyor.

Quality of finished product is maintained through an extensive process of inline and post curing quality control process steps. Such steps include measuring loft and roll width through the use of a fixture that cuts out single square foot samples. Another fixture is used to measure the compressive strength of a square foot sample. Each square foot sample is weighed. Additionally, the bottom skin and, if the product includes one, the top skin of a sample are removed, and a scale is used to determine the percentage by weight of the skin(s).

The detailed description is not intended to be limiting or represent an exhaustive enumeration of the principles disclosed herein. It will be apparent to those of skill in the art that numerous changes may be made in such details without departing from the spirit of the principles disclosed herein.

What is claimed is:

1. An apparatus for manufacture of continuous glass filament filtration media, comprising:
    a reservoir comprising binder and configured to control a temperature of the binder;
    a rotatable drum;
    a traversing glass melting furnace configured to move in a first direction parallel to an axis of rotation of the rotatable drum;
    a bushing plate coupled to the traversing glass melting furnace, the bushing plate consisting of Inconel, wherein the bushing plate comprises a plurality of orifices configured to spin filaments;
    wherein the traversing glass melting furnace comprises a combustion heat source positioned above the bushing plate;
    a binder sprayer coupled to the traversing glass melting furnace; and
    one or more shields coupled to the bushing plate and extending vertically below the bushing plate;
    wherein the one or more shields enclose no more than three sides below the bushing plate so that at least one side remains open.

2. The apparatus according to claim 1, wherein the bushing plate is oriented at a 5 to 7 degree angle relative to the axis of rotation of the rotatable drum.

3. The apparatus according to claim 1,
wherein the rotatable drum is 12 feet to 24 feet long; and
wherein the rotatable drum is 12 feet to 22 to feet in circumference.

4. The apparatus according to claim 3, wherein the rotatable drum comprises a shaft of 2.5 inches to 4.5 inches in diameter.

5. The apparatus according to claim 1, wherein the one or more shields extend 6 inches to 24 inches below the bushing plate.

6. The apparatus according to claim 1, wherein the plurality of orifices comprise countersunk openings.

7. The apparatus according to claim 6, wherein each of the plurality of orifices comprises an entry throat angle of 70 degrees to 100 degrees.

8. The apparatus according to claim 6, wherein each of the plurality of orifices comprises a tip with a tip length of 0.095 inch to 0.25 inch.

9. The apparatus according to claim 1, further comprising an aqueous solution sprayer coupled to the traversing glass melting furnace.

10. The apparatus according to claim 1, wherein the binder sprayer is configured to spray binder onto a swath of fiberglass filament on the rotatable drum.

11. The apparatus according to claim 10, wherein the binder comprises at least one of the group consisting of: urea formaldehyde, styrene, acrylic co-polymers, and acrylate polymers.

12. The apparatus according to claim 1, further comprising a cooling loop assembly.

13. The apparatus according to claim 12, wherein the cooling loop assembly comprises:
a plurality of tubes containing chilled liquid; and
an air tube comprising a plurality of openings.

14. The apparatus according to claim 13, wherein:
the plurality of tubes comprises copper tubes; and
at least one of the plurality of tubes is positioned within one inch of the bushing plate.

15. The apparatus according to claim 1, wherein the plurality of orifices consists of 298 to 425 orifices.

16. The apparatus according to claim 1, wherein each of the orifices comprises a diameter of 0.14 inch to 0.19 inch.

17. The apparatus according to claim 15, wherein the orifices are configured in 7 to 10 rows.

18. The apparatus according to claim 1, wherein the bushing plate is centered over a longitudinal edge of the rotatable drum.

19. The apparatus according to claim 1, wherein the one or more shields comprises one or more metal plates.

* * * * *